United States Patent
Wolff et al.

(10) Patent No.: US 6,217,971 B1
(45) Date of Patent: Apr. 17, 2001

(54) MAGNETIC DISK COMPRISING A SUBSTRATE

(75) Inventors: Silke Wolff, Huckeswagen; Burkhard Speit; Peter Brix, both of Mainz, all of (DE)

(73) Assignee: Schott Glas Mainz (DE)

( * ) Notice: Subject to any disclaimer, the term of this patent is extended or adjusted under 35 U.S.C. 154(b) by 0 days.

(21) Appl. No.: 09/432,663

(22) Filed: Nov. 3, 1999

(30) Foreign Application Priority Data

Nov. 4, 1998 (DE) .............................................. 198 50 744

(51) Int. Cl.$^7$ ........................................................ B32B 3/02
(52) U.S. Cl. ...................... 428/65.3; 428/426; 428/432; 428/433; 428/692; 428/696; 428/702; 428/900
(58) Field of Search .................................. 501/73, 77, 78; 428/65.3, 426, 432, 433, 692, 696, 702, 900

(56) References Cited

U.S. PATENT DOCUMENTS

| | | |
|---|---|---|
| 4,544,974 | * 10/1985 | West, Jr. . |
| 5,705,234 | 1/1998 | Yamamoto et al. . |
| 5,726,108 | * 3/1998 | Taguchi . |
| 5,900,296 | * 5/1999 | Hayashi . |
| 5,997,977 | * 12/1999 | Zou . |

FOREIGN PATENT DOCUMENTS

| | | |
|---|---|---|
| 3216451 | 11/1983 | (DE) . |
| 2660012 | 12/1983 | (DE) . |
| 3420306 | 1/1985 | (DE) . |
| 58-46459 | 10/1983 | (JP) . |
| 63-170247 | 7/1988 | (JP) . |
| 529012 | 1/1997 | (JP) . |
| 9604651 | 2/1996 | (WO) . |

OTHER PUBLICATIONS

Paper entitled "The Alternate Alternative Substrate—'Chemically Strengthened' Aluminum" Perettie et al., IDEMA p. 55–60, presented at IDEMA Symposium, Sep. 5, 1995, San Jose, California.

* cited by examiner

Primary Examiner—Timothy M. Speer
(74) Attorney, Agent, or Firm—Nils H. Ljungman & Associates

(57) ABSTRACT

Magnetic disks comprising a substrate and glass materials which are used in the manufacture of hard disc substrates. The glasses can have the following compositions (in per cent by weight on an oxide basis): $SiO_2$ 10–30, $Al_2O_3$ 0–5, $B_2O_3$ 0–8, $Li_2O$ 0–8, $Na_2O$ 1–10, with $Li_2O+Na_2O$ 5–10, $K_2O$ 0–3, MgO 5–16, CaO 0–15, with MgO+CaO>15–25, SrO+BaO 0–8, $ZrO_2$ 0–8, $TiO_2$ 7–25, $La_2O_3$ 0–10, $Nb_2O_5$ 5–20, $V_2O_5$ 0–10, $CeO_2$ 0–1, $As_2O_3+Sb_2O_3+F$ 0.1–1. These glasses can have high dimensional stability as a result of their high specific modulus of elasticity, to be especially suited for hard disk substrates.

11 Claims, 1 Drawing Sheet

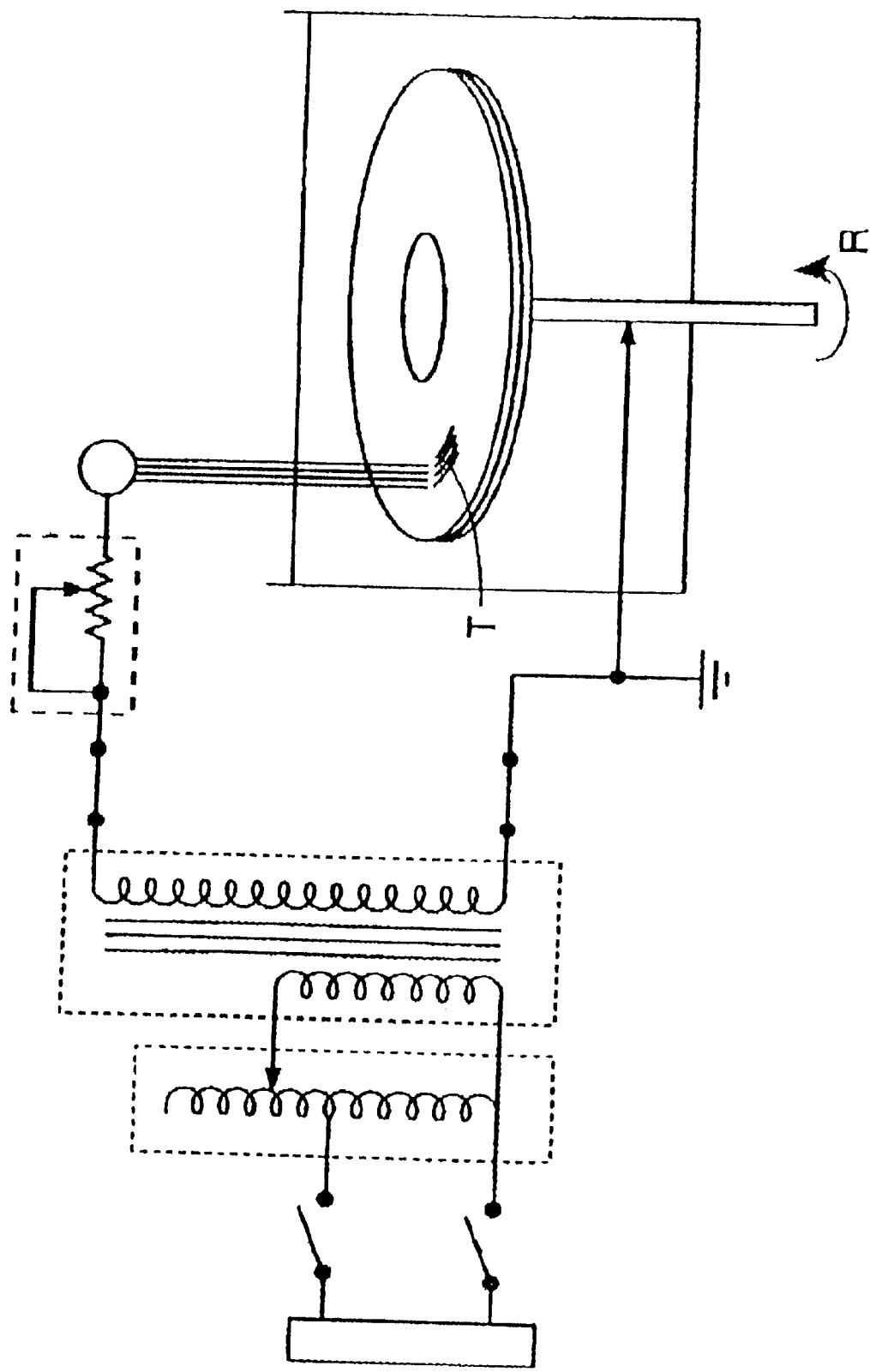

MAGNETIC DISK COMPRISING A SUBSTRATE

BACKGROUND OF THE INVENTION

1. Field of the Invention

The present invention relates to a magnetic disk comprising a substrate, and the use of glasses having a high specific modulus of elasticity for the manufacture of hard disk substrates, for example, substrates for hard disk drives in computers.

2. Background Information

Glass has advantages over metals such as aluminum or metal alloys for use as a substrate for data media (hard disks), among other things on account of its low surface roughness and its flatness. Such substrate glasses must be able to withstand the increased chemical, thermal and mechanical loads experienced during use. For example, during coating (e.g. by cathodic sputtering), they are exposed to high temperatures and rapid cooling rates. When they are used as hard disks, they are also exposed to high mechanical loads, e.g. during installation on the drive shaft they experience loads of up to 100 N/mm², and in operation, they can experience additional stresses caused by centrifugal forces at high speeds of currently 3,500 to 10,000 rpm. Such loads can be survived by thin glass, which is generally 0.25 to 3.0 mm thick, generally only if it has been surface-tempered. Because the permissible mechanical load carrying capacity can be increased by thermal tempering only above a minimum thickness of 3 mm, it must be possible to chemically temper the glasses used for the above mentioned application. Accordingly, the glass can be tempered by ion exchange in a salt bath below the transformation temperature $T_g$, i.e. the glass must have enough ions such as $Li^+$ and/or $Na^+$ suitable for the exchange. In addition to the surface flatness, the chemical resistance of the substrate glass is of decisive importance for the functionality of a fixed disk, because the read-write head is currently supported on a cushion of air at a distance of only about 50 nm above the rotating hard disk. This distance must remain substantially guaranteed for correct operation. This distance is reduced, however, if the surface of the hard disk substrate is not resistant to atmospheric effects and/or if chemical corrosion has roughened the surface even before the coating has been applied, or if the surface loses its adherence to the applied coatings on account of atmospheric influences, and the coating subsequently detaches from it. An additional essential characteristic of glasses that are suitable for use as hard disk substrates is their thermal expansion behavior, which must not be too different from that of the coating materials (e.g. co-alloys that have coefficients of thermal expansion $\alpha_{20/300} \geq 12 \times 10^{-6}/K$) and above all not too different from that of the clamping materials and spindle materials of the disk drive (at $\alpha_{20/300} \geq 12 \times 10^{-6}/K$), to eliminate stresses.

One requirement to increase the density of information and the read-write speed is a reduction of the floating height of the read-write head above the hard disk. A lower head gap or floating height makes faster access times possible.

The floating or flying height cannot currently be reduced to any desired height, because when the hard disk is rotating, fluctuations in the drive system can be caused by locally severe air turbulence and by impacts, that are expressed in a sort of fluttering movement of the hard disk. If the floating or flying height of the read-write head were too low, these deviations from the neutral position would cause the read-write head to lose its orientation to the information content of the spot on the hard disk ("runout"), or the read-write head might even collide with the hard disk ("head crash").

To prevent these undesirable occurrences and to make possible high speeds of rotation, the hard discs substantially require a high dimensional stability, i.e. they should have the smallest possible flutter on their outer edges as a function of time.

The maximum disc flutter W is described by the following formula:

$$W = \frac{\rho \times r_A^4}{E \times d^2} f(v)$$

where:

$\rho$ = density $r_A$ = outside diameter of the hard disk $E$ = modulus of elasticity $d$ = thickness of the hard disk $f(v)$ = geometry-specific parameter On the basis of this formula, the principal requirement for new materials for hard disks is that they reduce the maximum flutter W with a high modulus elasticity E and/or a low density $\rho$, with uniform geometry ($r_A$, d constant). Conventionally, the quotient of these two parameters E/$\rho$ is designated the specific modulus of elasticity. Like the desired high modulus of elasticity, this parameter should assume the highest possible value.

As a material for high speeds of revolution, there is a composite material consisting of Al-B-C (IDEMA, Alternative Substrates III (Sep. 5, 1995, San Jose, Calif.), p. 55–60: D. J. Perettie et al. "The Alternate Alternative Substrate—"Chemically Strengthened Aluminum"), which has a low density, high strength and a very high specific modulus of elasticity E/$\rho$. However, the above mentioned material is extremely difficult and expensive to polish to the surface quality with a roughness (RMS value) of less than 0.4 nm required for high-quality hard disks. It is very expensive to manufacture hard disks from this material, primarily on account of the high abrasion hardness.

WO 96/04651 describes a data medium in the form of a composite disk made of glass and a visco-elastic material, in which vibrations are damped by the layer of the visco-elastic material, which can, for example, be made of plastics such as synthetic rubbers, e.g. silicon rubber, or polyester, polyurethane or polyamide. One disadvantage of this method is that the manufacturing process is very expensive, and the visco-elastic material experiences fatigue (becomes brittle) with time, and can no longer function as a vibration damper. The plastics used can also be degasified if the magnetic layer is deposited by cathodic sputtering at an elevated substrate temperature, which thereby has an adverse effect on the quality of the layer applied.

OBJECT OF THE INVENTION

An object of the present invention is to make available glasses for the manufacture of hard disk substrates, i.e. glasses that have the necessary mechanical characteristics, have sufficient dimensional stability and are therefore suitable for high speeds of revolution.

SUMMARY OF THE INVENTION

The invention teaches that this object can be accomplished by glasses having the following composition (in per cent by weight on an oxide basis) for the manufacture of hard disk substrates:

| | |
|---|---|
| $SiO_2$ | 10–30 |
| $Al_2O_3$ | 0–5 |
| $B_2O_3$ | 0–8 |
| $Li_2O$ | 0–8 |
| $Na_2O$ | 1–10 |
| with $Li_2O + Na_2O$ | 5–10 |
| MgO | 5–16 |
| CaO | 0–15 |
| with MgO + CaO | >15–25 |
| SrO + BaO | 0–8 |
| $ZrO_2$ | 0–8 |
| $TiO_2$ | 7–25 |
| $La_2O_3$ | 0–10 |
| $Nb_2O_5$ | 5–20 |
| $V_2O_5$ | 0–10 |
| $CeO_2$ | 0–1 |
| $As_2O_3 + Sb_2O_3 + F$ | 0.1–1 |

BRIEF DESCRIPTION OF THE DRAWING

The FIGURE shows a schematic illustration of a hard disk drive, in which the present invention may be utilized.

DESCRIPTION OF THE PREFERRED EMBODIMENTS

The FIGURE schematically illustrates a hard disk drive with a magnetic disk, in which the present invention may be utilized. The FIGURE is explained in column 3, line 15 through column 4, line 10, of U.S. Pat. No. 5,705,234, which is hereby incorporated by reference as if set forth in its entirety herein.

It is known that similar glasses can be used as optical glass. For example, JP 58-46459 B2 describes a very broad range of glass compositions for optical glasses with, among other things, 10–50 wt. % $SiO_2$, 5–50 wt. % $Nb_2O_5$ and 5–40 wt. % RO, although the earth alkali oxides are not specified in the claims in any greater detail. On the basis of the examplesin JP 58-46459, the glasses contain high amounts of BaO or CaO, and contain little or no MgO (3 wt. %). JP 63-170 247 A describes glasses that have a comparatively high $SiO_2$ content, namely 30–65 mol. %, and up to 30 mol. % $Li_2O$ for lenses with refraction gradients. JP 52-9012 A describes optical glasses with a relatively high content of $SiO_2+Al_2O_3+B_2O_3$ (at least 40 wt. %) with 20–52 wt. % $SiO_2$, 0–13 wt. % $Al_2O_3$ and 0–20 wt. % $B_2O_3$, whereby the glasses in the examples, compared to the glasses described by this invention, contain either a great deal of $SiO_2$ ($\geq 33$ wt. %) or a great deal of $B_2O_3$ ($\geq 9.5$ wt. %).

The glasses described above, with all their many possible variations in the composition, do not meet the requirements for glasses that can be used to manufacture hard disks, or more specifically, substrates for hard disks.

It has been found that a glass from a rather narrow range of compositions is excellently suited for the manufacture of hard disk substrates. Such ranges, in per cent by weight on an oxide basis, can be: $SiO_2$ 10–30, preferably at least about 15, and particularly preferably at least about 20, $Al_2O_3$ about 0–5, preferably a maximum of about 4, $B_2O_3$ about 0–8, preferably a maximum of about 5, $Li_2O$ about 0–8, preferably at least about 1, $Na_2O$ about 1–10, with $Li_2O+Na_2O$ about 5–10, $K_2O$ about 0–3, MgO about 5–16, preferably at least about 10, CaO about 0–15, with MgO+CaO>about 15–25, SrO+BaO about 0–8, preferably a maximum of about 5, $ZrO_2$ about 0–8, $TiO_2$ about 7–25, $La_2O_3$ about 0–10, $Nb_2O_5$ about 5–20, preferably at least about 8, $V_2O_5$ about 0–10, preferably a maximum of about 5, $CeO_2$ about 0–1, preferably containing no or essentially no $CeO_2$, $As_2O_3+Sb_2O_3+F$ about 0.1–1.

The glasses can have a high concentration of earth alkali or alkaline earth metals. For example, the sum of MgO and CaO can be between greater than about 15 and about 25 wt. %, with about 5 to about 16 wt. % MgO, and about 0 to about 15 of the combination of CaO. MgO and CaO can promote the high modulus of elasticity with simultaneously low density. CaO also can improve the devitrification stability. The glasses can also contain up to about 8 wt. % SrO and/or BaO, which, at their low alkali concentration, can improve both the melting behavior and also the high coefficient of expansion which is necessary for their use as a hard disk substrate.

On account of their prederred required minimum total $Na_2O+Li_2O$ (at least about 5 wt. %, whereby preferably both $Na_2O$ and also $Li_2O$ are present), in spite of the relatively high earth alkali concentration, the glasses can be chemically tempered or strengthened, preferably in potassium/sodium salt baths, with a ratio of sodium salt(s) to potassium salt(s) of up to about 6:1.

The components $Nb_2O_5$ and $TiO_2$, which must essentially absolutely be present in larger quantities, and the optional components $La_2O_3$ and $V_2O_5$ can also have a positive effect on the modulus of elasticity. The proportions of these four components can vary within the relatively broad range indicated above. However, if the $TiO_2$ content is too high, the meltability can be adversely affected.

The optional component $B_2O_3$ can improve the meltability. $Al_2O_3$ is also an optional component, and can improve the chemical resistance and ion exchange capability. The meltability can adversely be affected by concentrations higher than about 5 wt. % $Al_2O_3$.

To improve the quality of the glass, the glasses can contain refining agents, such as $As_2O_3$, $Sb_2O_3$ and/or fluoride. The glasses can also contain $CeO_2$ for this purpose.

$Nb_2O_5$ does not increase the modulus of elasticity as effectively as $TiO_2$ and MgO. But because even higher concentrations of $TiO_2$ and/or MgO would likely promote the excessive crystallization of the glasses, the glasses can contain all three components in the above mentioned essentially required minimum proportions. The sum of these oxides is preferably between about 20 and about 45 wt. %, because such a required minimum (about 20 wt. %) content produces a particularly high modulus of elasticity, and the crystallization stability is good with such a maximum concentration (about 45 wt. %). The sum of the above mentioned oxides is in particular between about 30 and about 44 wt. %.

Exemplary Embodiments

Table 1 presents four examples of glasses as claimed by the invention. The table indicates their composition and presents information on the most relevant characteristics of the glasses.

The glasses were prepared from conventional raw materials.

Their high chemical resistance is documented by the acid resistance class as measured according to ISO 8424. The glasses have an acid resistance class of at least 2. Such glasses, in the climatic chamber test, in which they are exposed for about one week to a temperature of about 80° C. and about 80% relative humidity, and are then examined under a microscope at 40X magnification for changes on the surface (alkali carbonate formation), exhibited only salt efflorescences on the order of magnitude of the limits of detection.

To detect the chemical tempering capability, glass bodies with the dimensions about 30 mm×30 mm×2 mm were manufactured and left in a bath consisting of 30 wt. % $KNO_3$ and 70 wt. % $NaNO_3$ at 480° C. for 8 hours. By means of EDX, it was possible to detect exchange zones with conventional stress values with thicknesses of at least about 10 μm.

The coefficient of thermal expansion $\alpha_{20/300}$ of the glasses is between about $8.0 \times 10^{-6}/K$ and about $11.0 \times 10^{-6}/K$ and is thus sufficiently close to the coefficients of thermal expansion of the coating materials for hard disks.

The table also indicates the modulus of elasticity [$10^3$ $N/mm^2$], determined on untempered specimens, the density ρ [$g/cm^3$] and the specific modulus of elasticity E/ρ [$10^5$ N cm/g].

TABLE 1

Compositions (per cent by weight on oxide basis) and major characteristics of the glasses:

|  | 1 | 2 | 3 | 4 |
|---|---|---|---|---|
| $SiO_2$ | 27.4 | 27.4 | 27.4 | 27.4 |
| $B_2O_3$ | 4.0 | 4.0 | 4.0 | 4.0 |
| $Li_2O$ | 6.4 | 6.4 | 6.4 | 6.4 |
| $Na_2O$ | 1.1 | 1.1 | 1.1 | 1.1 |
| MgO | 15.0 | 15.0 | 7.0 | 8.5 |
| CaO | 8.9 | 8.9 | 8.9 | 8.9 |
| $TiO_2$ | 12.0 | 7.0 | 15.0 | 8.5 |
| $ZrO_2$ | 5.2 | 5.2 | 5.2 | 5.2 |
| $La_2O_3$ | 9.7 | 9.7 | 9.7 | 9.7 |
| $Nb_2O_5$ | 10.0 | 15.0 | 15.0 | 20.0 |
| $Sb_2O_3$ | 0.3 | 0.3 | 0.3 | 0.3 |
| E [$10^3$ $N/mm^2$] | 123 | 122 | 121 | 120 |
| ρ [$g/cm^3$] | 3.30 | 3.33 | 3.38 | 3.39 |
| E/ρ [$10^5$ N cm/g] | 37.3 | 36.6 | 35.8 | 35.4 |
| $\alpha_{20/300}$ [$10^{-6}/K$] | 10.29 | 10.23 | 9.75 | 9.87 |

Only if a glass has all or substantially all the characteristics discussed above is it suitable for use for the manufacture of the hard disk substrate for high speeds of revolution.

For example, the glass having the composition (per cent by weight on oxide basis) $SiO_2$ 52.9, $Al_2O_3$ 21.1, and MgO 26.0, with a modulus of elasticity E of 129 GPa and a density ρ of 2.91 $g/cm^3$ therefore has a high specific modulus of elasticity E/ρ of $44.3 \times 10^5$ N cm/g and is therefore sufficiently dimensionally stable, although it cannot be chemically tempered, and it is difficult to manufacture into thin sheets of raw glass, because it is easily crystallized. Therefore it is unsuitable for the manufacture of hard disk substrates.

On the other hand, the glasses claimed by the present invention can meet all the requirements for mechanical characteristics, and are suitable for the manufacture of hard drive substrates, even for high speeds of revolution:

As a result of their high specific modulus of elasticity E/ρ of at least $34 \times 10^5$ N cm/g, they have high dimensional stability. Oscillation amplitudes remain small, and oscillation energies are rapidly dissipated. As a result of the small deformation of the hard disc during revolution, even at high speeds of revolution, the flying height, which is approximately twice the floating height, of the read-write head can be reduced to 50 nm and/or the speed of revolution of the hard disc can be increased to more than 10,000 rpm. Because the increase in the speed of revolution causes an increase in the temperature as a result of the motor, and an increase in air turbulence in the drive, there are safety problems in the event of excessive speeds of revolution, i.e. above approximately 15,000 rpm.

They can be chemically tempered, as a result of which sufficiently thick compression stress zones are produced. Their mechanical strength is thereby increased.

They have high chemical resistance.

Their thermal expansion, at $\alpha_{20/300} \geq$ between $8.0 \times 10^{-6}/K$ and $11.0 \times 10^{-6}/K$ agrees sufficiently well with that of the clamping material, the drive shaft and the coating materials.

They can be correctly polished. They can be worked to a micro-roughness of ≦ about 0.4 nm. They have removal rates for lapping, grinding and polishing that are typical of homogeneous materials, namely about 10–20 μm/min. for lapping, about 20–40 μm/min. for grinding and approximately 1 μm/min. for polishing. They therefore have an excellent surface quality, in particular flatness.

One feature of the invention resides broadly in the use of a glass having the following composition (in per cent by weight on an oxide basis):

| $SiO_2$ | 10–30 |
|---|---|
| $Al_2O_3$ | 0–5 |
| $B_2O_3$ | 0–8 |
| $Li_2O$ | 0–8 |
| $Na_2O$ | 1–10 |
| with $Li_2O + Na_2O$ | 5–10 |
| $K_2O$ | 0–3 |
| MgO | 5–16 |
| CaO | 0–15 |
| with MgO + CaO | >15–25 |
| SrO + BaO | 0–8 |
| $ZrO_2$ | 0–8 |
| $TiO_2$ | 7–25 |
| $La_2O_3$ | 0–10 |
| $Nb_2O_5$ | 5–20 |
| $V_2O_5$ | 0–10 |
| $CeO_2$ | 0–1 |
| $As_2O_3 + Sb_2O_3 + F$ | 0.1–1, | for the manufacture of hard disk substrates.

Another feature of the invention resides broadly in the use of a glass characterized by the following composition (in per cent by weight on an oxide basis):

| $SiO_2$ | 15–30 |
|---|---|
| $Al_2O_3$ | 0–5 |
| $B_2O_3$ | 0–8 |
| $Li_2O$ | 1–8 |
| $Na_2O$ | 1–10 |
| with $Li_2O + Na_2O$ | 5–10 |
| $K_2O$ | 0–3 |
| MgO | 5–16 |
| CaO | 0–15 |
| with MgO + CaO | >15–25 |
| SrO + BaO | 0–5 |
| $ZrO_2$ | 0–8 |
| $TiO_2$ | 7–25 |
| $La_2O_3$ | 0–10 |
| $Nb_2O_5$ | 8–20 |
| $V_2O_5$ | 0–5 |
| $As_2O_3 + Sb_2O_3 + F$ | 0.1–1. |

Yet another feature of the invention resides broadly in the use of a glass characterized by the fact that the sum of $Nb_2O_5$, $TiO_2$ and MgO is about 20–about 45 wt. %.

Still another feature of the invention resides broadly in the use of a glass characterized by the fact that the sum of $Nb_2O_5$, $TiO_2$ and MgO is about 30–about 44 wt. %.

A further feature of the invention resides broadly in the use of a glass that has a coefficient of thermal expansion $\alpha_{20/300} \geq$ about $8.0 \times 10^{-6}$/K, a modulus of elasticity of more than about $115 \times 10^3$ N/mm² and a specific modulus of elasticity E/ρ of at least about $34 \times 10^5$ N m/g.

Examples of hard disk drives, and components for making hard disk drives may be found in the following U.S. patents: No. 5,909,341, issued Jun. 1, 1999 to Hikosaka et al.; No. 5,825,596, issued Oct. 20, 1998 to Hikosaka et al.; No. 5,705,234, issued Jan. 6, 1998 to Yamamoto et al.; No. 5,672,435, issued Sep. 30, 1997 to Born et al.; No. 5,757,582, issued May 26, 1998 to White et al.; No. 5,621,582, issued Apr. 15, 1997 to Stefansky, No. 5,408,374, issued Apr. 18, 1995 to Morehouse et al.; and No. 5,333,079, issued Jul. 26, 1994 to Takegami et al.

Examples of hard disk drives, and components therefore, and substrates for hard disk drives, which may be used in embodiments of the present invention, may be found in the following U.S. patents: No. 5,895,696, issued Apr. 20, 1999 to Stanish et al.; No. 5,616,426, issued Apr. 1, 1997 to Tenhover et al.; No. 5,800,895, issued Sep. 1, 1998 to Vygovsky et al.; No. 5,834,106, issued Nov. 10, 1998 to Kamiaka et al.; and No. 5,948,495, issued Sep. 7, 1999 to Stanish et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 198 50 744.5-45, filed on Nov. 4, 1998, having inventors Dr. Silke Wolff, Dr. Burkhard Speit, and Dr. Peter Brix, and DE-OS 198 50 744.5-45 and DE-PS 198 50 744.5-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A magnetic disk comprising a substrate, said substrate comprising a glass having the following composition (in per cent by weight on an oxide basis):

| | |
|---|---|
| $SiO_2$ | 10–30 |
| $Al_2O_3$ | 0–5 |
| $B_2O_3$ | 0–8 |
| $Li_2O$ | 0–8 |
| $Na_2O$ | 1–10 |
| with $Li_2O + Na_2O$ | 5–10 |
| $K_2O$ | 0–3 |
| MgO | 5–16 |
| CaO | 0–15 |
| with MgO + CaO | >15–25 |
| SrO+BaO | 0–8 |
| $ZrO_2$ | 0–8 |
| $TiO_2$ | 7–25 |
| $La_2O_3$ | 0–10 |
| $Nb_2O_5$ | 5–20 |
| $V_2O_5$ | 0–10 |
| $CeO_2$ | 0–1 |
| $As_2O_3 + Sb_2O_3 + F$ | 0.1–1. |

2. The magnetic disk according to claim 1, wherein said glass contains the composition (in per cent by weight on an oxide basis):

| | |
|---|---|
| $SiO_2$ | 15–30 |
| $Al_2O_3$ | 0–5 |
| $B_2O_3$ | 0–8 |
| $Li_2O$ | 1–8 |
| $Na_2O$ | 1–10 |
| with $Li_2O + Na_2O$ | 5–10 |
| $K_2O$ | 0–3 |
| MgO | 5–16 |
| CaO | 0–15 |
| with MgO + CaO | >15–25 |
| SrO + BaO | 0–5 |
| $ZrO_2$ | 0–8 |
| $TiO_2$ | 7–25 |
| $La_2O_3$ | 0–10 |
| $Nb_2O_5$ | 8–20 |
| $V_2O_5$ | 0–5 |
| $As_2O_3 + Sb_2O_3 + F$ | 0.1–1. |

3. The magnetic disk according to claim 2, wherein the sum of $Nb_2O_5$, $TiO_2$ and MgO in said glass is about 20 to about 45 wt. %.

4. The magnetic disk according to claim 3, wherein the sum of $Nb_2O_5$, $TiO_2$ and MgO in said glass is about 30 to about 44 wt. %.

5. The magnetic disk according to claim 1, wherein the sum of $Nb_2O_5$, $TiO_2$ and MgO in said glass is about 20 to about 45 wt. %.

6. The magnetic disk according to claim 5, wherein the sum of $Nb_2O_5$, $TiO_2$ and MgO in said glass is about 30 to about 44 wt. %.5).

7. The magnetic disk according to claim 1, wherein said glass has a coefficient of thermal expansion $\alpha_{20/300} \geq 8.0 \times 10^{-6}$/K, a modulus of elasticity of more than $115 \times 10^3$ N/mm² and a specific modulus of elasticity E/ρ of at least $34 \times 10^5$ N cm/g.

8. The magnetic disk according to claim 2, wherein said glass has a coefficient of thermal expansion $\alpha_{20/300} \geq 8.0 \times 10^{-6}$/K, a modulus of elasticity of more than $115 \times 10^3$ N/mm² and a specific modulus of elasticity E/ρ of at least $34 \times 10^5$ N cm/g.

9. The magnetic disk according to claim 3, wherein said glass has a coefficient of thermal expansion $\alpha_{20/300} \geq 8.0 \times 10^{-6}$/K, a modulus of elasticity of more than $115 \times 10^3$ N/mm² and a specific modulus of elasticity E/ρ of at least $34 \times 10^5$ N cm/g.

10. The magnetic disk according to claim 4, wherein said glass has a coefficient of thermal expansion $\alpha_{20/300} \geq 8.0 \times$ $10^{-6}$/K, a modulus of elasticity of more than $115\times10^3$ N/mm$^2$ and a specific modulus of elasticity E/$\rho$ of at least $34\times10^5$ N cm/g.

11. The magnetic disk according to claim 5, wherein said glass has a coefficient of thermal expansion $\alpha_{20/300} \geqq 8.0\times 10^{-6}$/K, a modulus of elasticity of more than $115\times10^3$ N/mm$^2$ and a specific modulus of elasticity E/$\rho$ of at least $34\times10^5$ N cm/g.

\* \* \* \* \*

UNITED STATES PATENT AND TRADEMARK OFFICE
CERTIFICATE OF CORRECTION

PATENT NO. : 6,217,971 B1
DATED : April 17, 2001
INVENTOR(S) : Silke Wolff, Burkhard Speit, and Peter Brix It is certified that error appears in the above-identified patent and that said Letters Patent is hereby corrected as shown below:

Title page,
Item [57], ABSTRACT,
Line 7, after "$Nb_2O_5$", delete "$5\ 20$" and insert
-- 5-20 --.
Line 8, before "0-10,", delete "$v_2O_5$" and insert -- $V_2O_5$ --.

Column 1,
Lines 52 and 54, after "$\infty_{20/300}$", delete ">" and insert -- $\geq$ --.

Column 3,
Line 49, after "$SiO_2$", delete "(>33" and insert -- ($\geq$ 33 --.
Line 50, after "$B_2O_3$", delete "(>9.5" and insert -- ($\geq$ 9.5 --.

Column 6,
Line 5, after "$\infty_{20/300}$", delete ">" and insert -- $\geq$ --.
Line 10, after "of", delete "<" and insert -- $\leq$ --.

Column 7,
Line 1, after "$\infty_{20/300}$", delete ">" and insert -- $\geq$ --.

Column 8, claim 7,
Line 52, after "$\infty_{20/300}$", delete ">" and insert -- $\geq$ --.

Column 8, claim 8,
Line 57, after "$\infty_{20/300}$", delete ">" and insert -- $\geq$ --.

Column 8, claim 9,
Line 62, after "$\infty_{20/300}$", delete ">" and insert -- $\geq$ --.

UNITED STATES PATENT AND TRADEMARK OFFICE
CERTIFICATE OF CORRECTION

PATENT NO. : 6,217,971 B1
DATED : April 17, 2001
INVENTOR(S) : Silke Wolff, Burkhard Speit, and Peter Brix It is certified that error appears in the above-identified patent and that said Letters Patent is hereby corrected as shown below:

<u>Column 8, claim 10,</u>
Line 67, after "$\infty_{20/300}$", delete "$\geq$" and insert -- $\geq$ --.

<u>Column 9, claim 11,</u>
Line 5, after "$\infty_{20/300}$", delete "$\geq$" and insert -- $\geq$ --.

Signed and Sealed this

Eighteenth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 6,217,971 B1
DATED        : April 17, 2001
INVENTOR(S)  : Silke Wolff, Burkhard Speit and Peter Brix It is certified that error appears in the above-identified patent and that said Letters Patent is hereby corrected as shown below:

Title page,
Item [57], ABSTRACT,
Line 7, after "$Nb_2O_5$", delete "$_{5\ 20}$" and insert
-- 5-20 --.
Line 8, before "0-10,", delete "$v_2O_5$" and insert -- $V_2O_5$ --.

Column 1,
Lines 52 and 54, after "$\alpha_{20/300}$", delete "$\geqq$" and insert -- $\geq$ --.

Column 3,
Line 49, after "$SiO_2$", delete "($\geqq 33$" and insert -- ($\geq$ 33 --.
Line 50, after "$B_2O_3$", delete "($\geqq 9.5$" and insert -- ($\geq$ 9.5 --.

Column 6,
Line 5, after "$\alpha_{20/300}$", delete "$\geqq$" and insert -- $\geq$ --.
Line 10, after "of", delete "$\leqq$ and insert -- $\leq$ --.

Column 7,
Line 1, after "$\alpha_{20/300}$", delete "$\geqq$" and insert -- $\geq$ --.

Column 8, claim 7,
Line 52, after "$\alpha_{20/300}$", delete "$\geqq$" and insert -- $\geq$ --.

Column 8, claim 8,
Line 57, after "$\alpha_{20/300}$", delete "$\geqq$" and insert -- $\geq$ --.

Column 8, claim 9,
Line 62, after "$\alpha_{20/300}$", delete "$\geqq$" and insert -- $\geq$ --.

UNITED STATES PATENT AND TRADEMARK OFFICE
CERTIFICATE OF CORRECTION

PATENT NO.   : 6,217,971 B1
DATED        : April 17, 2001
INVENTOR(S)  : Silke Wolff, Burkhard Speit and Peter Brix It is certified that error appears in the above-identified patent and that said Letters Patent is hereby corrected as shown below:

Column 8, claim 10,
Line 67, after "$\alpha_{20/300}$", delete "$\geqq$" and insert -- $\geq$ --.

Column 9, claim 11,
Line 5, after "$\alpha_{20/300}$", delete "$\geqq$" and insert -- $\geq$ --.

This certificate supersedes Certificate of Correction issued December 18, 2001.

Signed and Sealed this

Tenth Day of December, 2002

JAMES E. ROGAN
*Director of the United States Patent and Trademark Office*